United States Patent
Bintz et al.

(10) Patent No.: US 9,341,066 B2
(45) Date of Patent: May 17, 2016

(54) TURBINE COMPRESSOR BLADE TIP RESISTANT TO METAL TRANSFER

(75) Inventors: Matthew E. Bintz, West Hartford, CT (US); Christopher W. Strock, Kennebunk, ME (US)

(73) Assignee: United Technologies Corporation, Hartford, CT (US)

(*) Notice: Subject to any disclaimer, the term of this patent is extended or adjusted under 35 U.S.C. 154(b) by 985 days.

(21) Appl. No.: 13/525,420

(22) Filed: Jun. 18, 2012

(65) Prior Publication Data

US 2013/0333392 A1  Dec. 19, 2013

(51) Int. Cl.
*F01D 5/28* (2006.01)
*F01D 5/20* (2006.01)
*F01D 11/12* (2006.01)

(52) U.S. Cl.
CPC *F01D 5/20* (2013.01); *F01D 11/12* (2013.01); *F05D 2230/90* (2013.01); *F05D 2300/2112* (2013.01); *F05D 2300/2118* (2013.01); *F05D 2300/2261* (2013.01); *F05D 2300/2283* (2013.01); *F05D 2300/611* (2013.01)

(58) Field of Classification Search
CPC ... F01D 11/12; F01D 5/20; F01D 2300/2283; F01D 2300/2261; F05D 2230/90; F05D 2300/2118; F05D 2300/2112; F05D 2300/611
See application file for complete search history.

(56) References Cited

U.S. PATENT DOCUMENTS

| | | | |
|---|---|---|---|
| 4,884,820 | A | 12/1989 | Jackson et al. |
| 5,603,603 | A | 2/1997 | Benoit et al. |
| 5,704,759 | A | 1/1998 | Draskovich et al. |
| 5,997,248 | A | 12/1999 | Ghasripoor et al. |
| 2009/0136740 | A1* | 5/2009 | Reynolds et al. ............. 428/325 |
| 2012/0099992 | A1 | 4/2012 | Strock et al. |

OTHER PUBLICATIONS

International Searching Authority Patent Cooperation Treaty, International Search Report and Written Opinion, Apr. 15, 2014, 13 pages.

* cited by examiner

*Primary Examiner* — Zelalem Eshete
(74) *Attorney, Agent, or Firm* — Kinney & Lange, P.A.

(57) ABSTRACT

A gas turbine engine having an engine casing extending circumferentially about an engine centerline axis; and a compressor section, a combustor section, and a turbine section within said engine casing. At least one of said compressor section and said turbine section includes at least one airfoil and at least one seal member adjacent to the at least one airfoil, wherein a tip of the at least one airfoil is metal having a thin film ceramic coating and the at least one seal member is coated with an abradable.

14 Claims, 3 Drawing Sheets

US 9,341,066 B2

TURBINE COMPRESSOR BLADE TIP RESISTANT TO METAL TRANSFER

BACKGROUND

As gas turbine engines evolve to provide better performance, they become hotter, faster and stronger. As a result, the materials used need to be able to function under those increased operating conditions.

SUMMARY

The invention comprises the use of non-abrasive blade tip coatings for use in sliding contact wear between the blade tip coating and an abradable surface. The invention is used in gas turbine engines where the melting point of the blade material is similar to, or lower than, that of the abradable material.

The coating on the non-abrasive blade tip is a thin ceramic coating that has high hardness, is very smooth and has good mechanical and thermal shock resistance. Thin film ceramic coatings include TiN, TiAlN, $Al_2O_3$, BN, SiCN, TiCN, and TiO. The coating is applied by vapor deposition methods, as conversion coatings, or by slurry application of nano particulate suspensions. These coatings resist adhesion of smeared coating materials during a rub event.

DETAILED DESCRIPTION

In recent gas turbine engine designs, metal airfoils mate with abradable coatings and have shown evidence of blade metal transfer to the abradable coating resulting in 8 mils of excess clearance in test engines. The high temperatures, blade count and tip speed result in blade tip and coating contact temperature during rub that exceeds historical experience. When this happens, and the blade tip and coating base metals have similar melting points, both materials soften and become prone to adhesive wear mechanisms. Also because blade tip surface area is lower than coating surface area, the tips reach a higher temperature while receiving similar rub energy input compared to the coating. For these reasons, the blade tips become prone to metal transfer to the coating during sliding contact wear.

Figure 1:
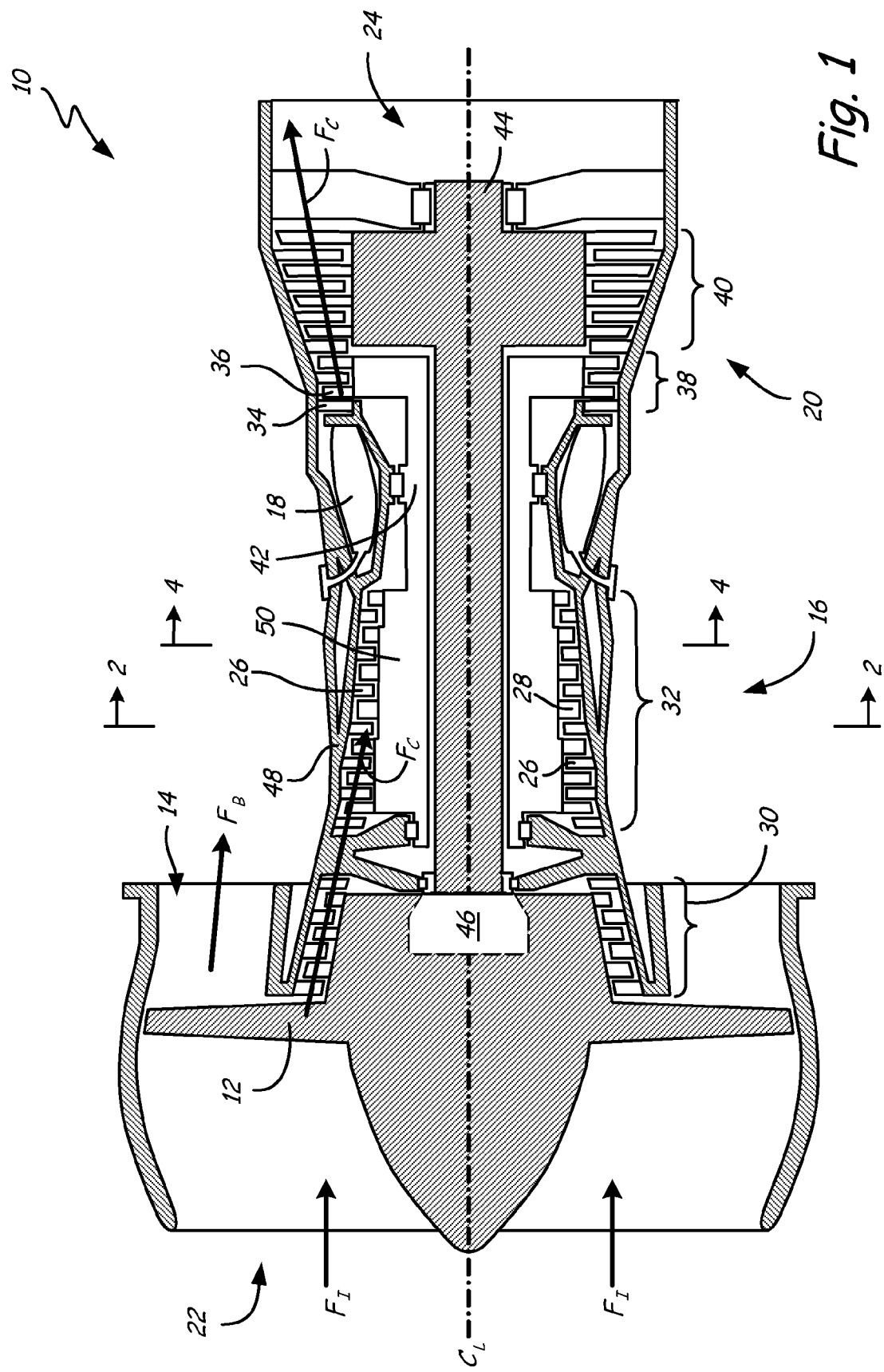
FIG. 1 illustrates a simplified cross-sectional view of a gas turbine engine.

FIG. 1 is a cross-sectional view of gas turbine engine 10, in a turbofan embodiment. As shown in FIG. 1, turbine engine 10 comprises fan 12 positioned in bypass duct 14, with bypass duct 14 oriented about a turbine core comprising compressor (compressor section) 16, combustor (or combustors) 18 and turbine (turbine section) 20, arranged in flow series with upstream inlet 22 and downstream exhaust 24.

Compressor 16 comprises stages of compressor vanes 26 and blades 28 arranged in low pressure compressor (LPC) section 30 and high pressure compressor (LPC) section 32. Turbine 20 comprises stages of turbine vanes 34 and turbine blades 36 arranged in high pressure turbine (HPT) section 38 and low pressure turbine (LPT) section 40. HPT section 38 is coupled to HPC section 32 via HPT shaft 32, forming the high pressure spool or high spool. LPT section 40 is coupled to LPC section 30 and fan 12 via LPT shaft 44, forming the low pressure spool or low spool. HPT shaft 42 and LPT shaft 44 are typically coaxially mounted, with the high and low spools independently rotating about turbine axis (centerline) $C_L$.

Fan 12 comprises a number of fan airfoils circumferentially arranged around a fan disk or other rotating member, which is coupled (directly or indirectly to LPC section 30 and driven by LPT shaft 44. In some embodiments, fan 12 is coupled to the fan spool via geared fan drive mechanism 46, providing independent fan speed control.

As shown in FIG. 1, fan 12 is forward-mounted and provides thrust by accelerating flow downstream through bypass duct 14, for example in a high-bypass configuration suitable for commercial and regional jet aircraft operations. Alternatively, fan 12 is an unducted fan or propeller assembly, in either a forward or aft-mounted configuration. In these various embodiments turbine engine 10 comprises any of a high-bypass turbofan, a low-bypass turbofan or a turboprop engine, and the number of spools and the shaft configurations may vary.

In operation of turbine engine 10, incoming airflow $F_I$ enters inlet 22 and divides into core flow $F_C$ and bypass flow $F_B$, downstream of fan 12. Core flow $F_C$ propagates along the core flowpath through compressor section 16, combustor 18 and turbine section 20, and bypass flow $F_B$ propagates along the bypass flowpath through bypass duct 14.

LPC section 30 and HPC section 32 of compressor 16 are utilized to compress incoming air for combustor 18, where fuel is introduced, mixed with air and ignited to produce hot combustion gas. Depending on embodiment, fan 12 also provides some degree of compression (or pre-compression) to core flow FC, and LPC section 30 (or a portion of it) may be omitted. Alternatively, an additional intermediate spool is included, for example in a three-spool turboprop or turbofan configuration.

Combustion gas exits combustor 18 and enters HPT section 38 of turbine 20, encountering turbine vanes 34 and turbine blades 36. Turbine vanes 34 turn and accelerate the flow, and turbine blades 36 generate lift for conversion to rotational energy via HPT shaft 42, driving HPC section 32 of compressor 16 via HPT shaft 42. Partially expanded combustion gas transitions from HPT section 38 to LPT section 40, driving LPC section 30 and fan 12 via LPT shaft 44. Exhaust flow exits LPT section 40 and turbine engine 10 via exhaust nozzle 24.

The thermodynamic efficiency of turbine engine 10 is tied to the overall pressure ratio, as defined between the delivery pressure at inlet 22 and the compressed air pressure entering combustor 18 from compressor section 16. In general, a higher pressure ratio offers increased efficiency and improved performance, including greater specific thrust. High pressure ratios also result in increased peak gas path temperatures, higher core pressure and greater flow rates, increasing thermal and mechanical stress on engine components.

Figure 2:
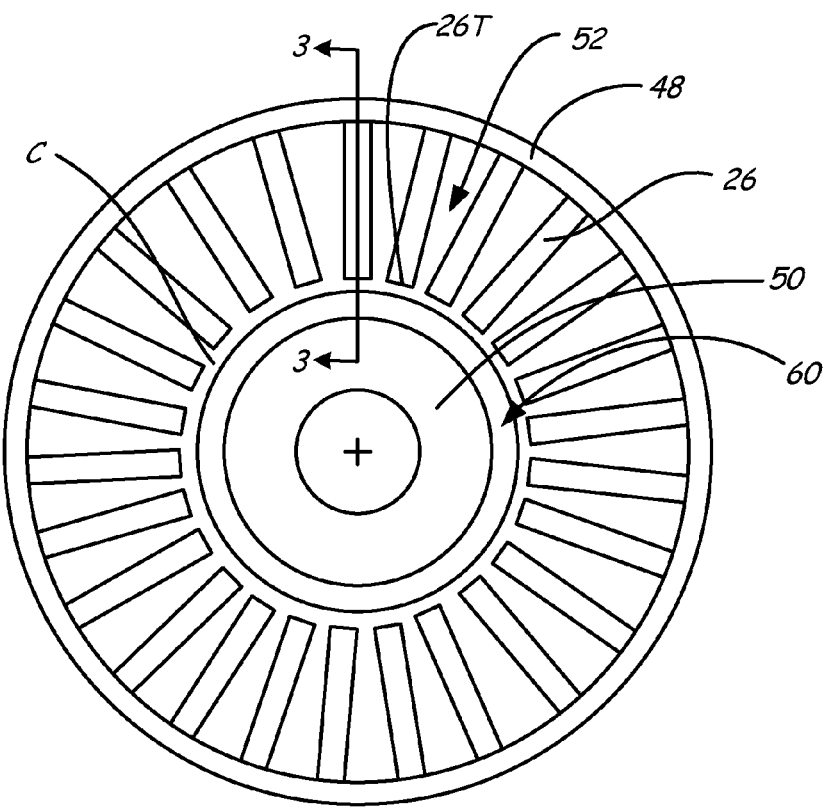
FIG. 2 illustrates a simplified cross-sectional view illustrating the relationship of the rotor and vanes taken along the line 2-2 of FIG. 1, not to scale.
Figure 3:
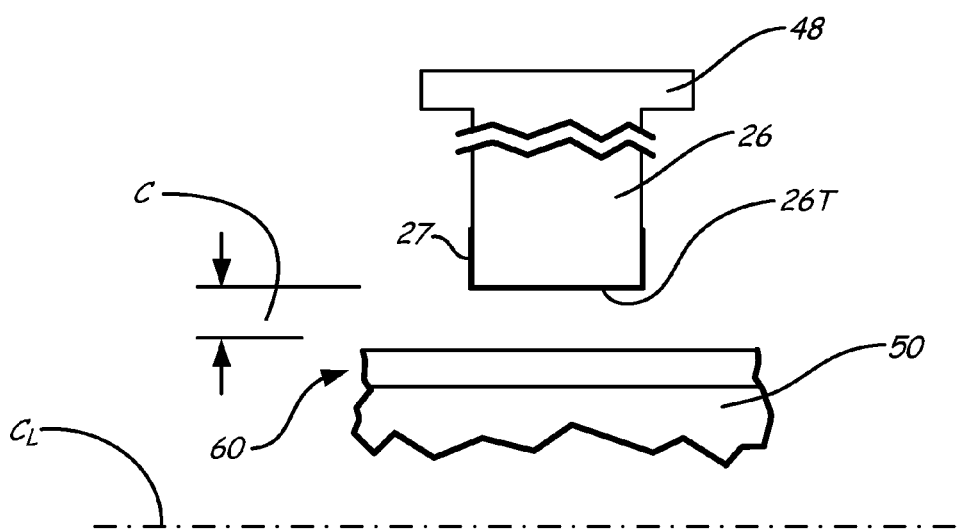
FIG. 3 is a cross-sectional view taken along the line 3-3 of FIG. 2, not to scale.
Figure 4:
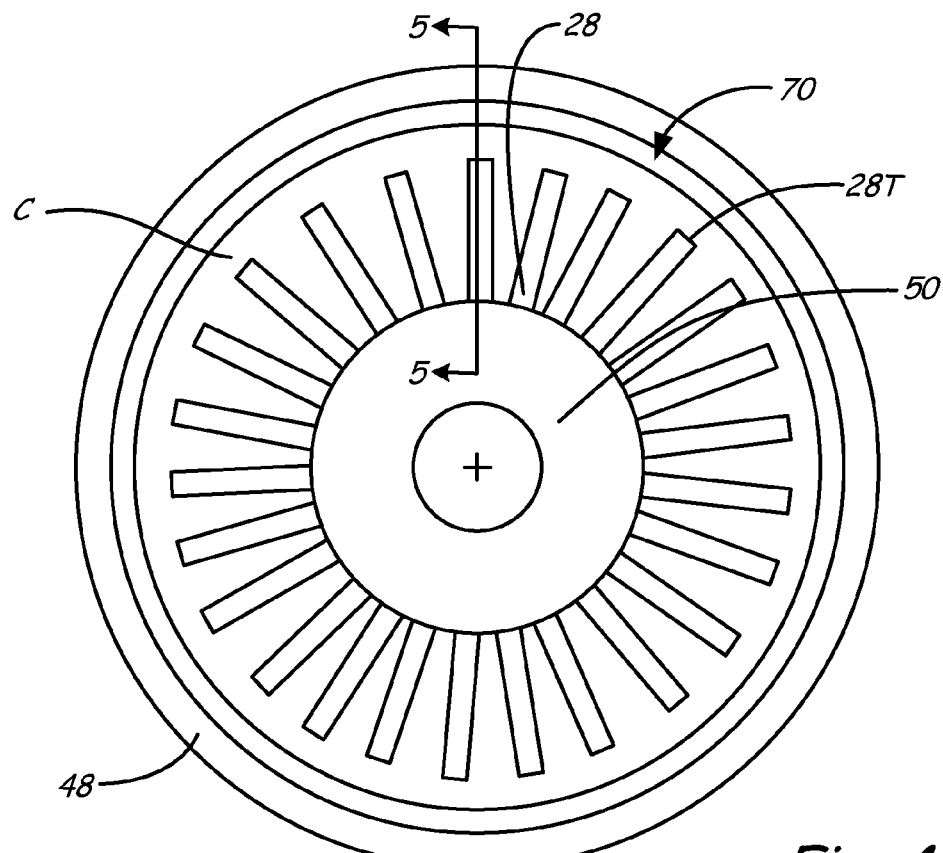
FIG. 4 illustrates a simplified cross-sectional view illustrating the relationship of the casing or shroud and blades taken along the line 4-4 of FIG. 1, not to scale.
Figure 5:
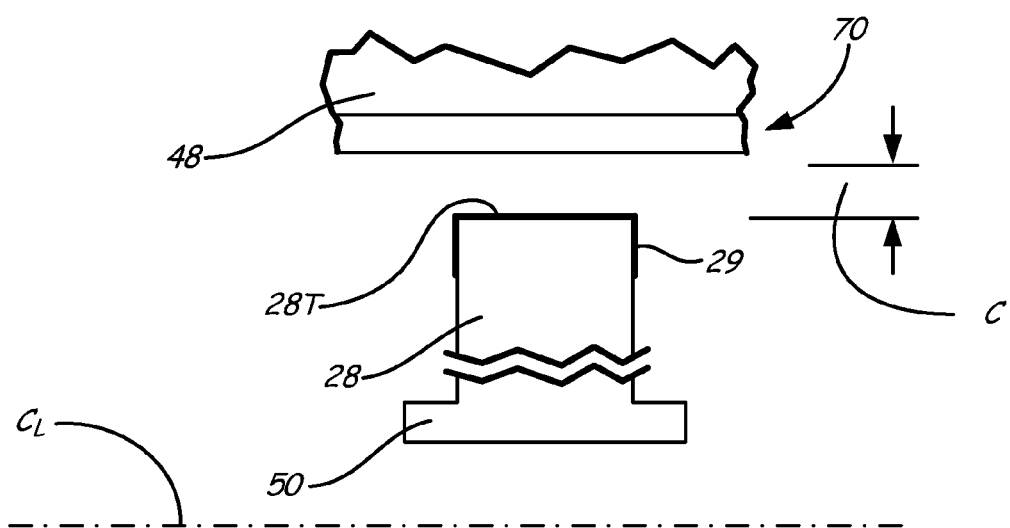
FIG. 5 is a cross-sectional view taken along the line 5-5 of FIG. 4, not to scale.

The present invention is intended to be used with airfoils in turbine engines. The term "airfoil" is intended to cover both rotor blades and stator vanes. It is the purpose of this invention to produce non-abrasive blade tip coatings. FIG. 2 and FIG. 3 disclose the invention with respect to interaction of a stator vane with a rotor. FIG. 4 and FIG. 5 disclose the invention with respect to interaction of a rotor blade with a casing or shroud. The coating of this invention may be used with either or both configurations.

FIG. 2 is a cross section along line 22 of FIG. 1 of a casing 48 which has a rotor shaft 50 inside. Vanes 26 are attached to casing 48 and the gas path 52 is shown as the space between vanes 26. Abradable coating 60, is on rotor shaft 50 such that the clearance C between coating 60 and abradable vane tips 26T of vanes 26 with thin film tip coating 27 has the proper tolerance for operation of the engine, e.g., to serve as a seal to prevent leakage of air (thus increasing efficiency), while not interfering with relative movement of the vanes and rotor shaft. In FIGS. 2 and 3, clearance C is expanded for purposes of illustration. In practice, clearance C may be, for example, in a range of about 25 to 55 mils (635 to 1397 microns) when the engine is cold and 0.000 to 0.035 mils during engine operation depending on the specific operating condition and previous rub events that may have occurred.

FIG. 3 shows the cross section along line 3-3 of FIG. 2, with casing 48 and vane 26. Coating 60 is attached to rotor shaft 50, with a clearance C between coating 60 and vane tip 26T of vane 26 with thin film tip coating 27 that varies with operating conditions, as described herein. Coating 60 is an abradable coating. Coating 27, described in detail below, is a thin film ceramic coating that has a melting or softening point higher than that of the abradable material 64 of abradable coating 60 and of abradable vane tip 26T of vane 26. Coating 27 has high hardness, is very smooth, and has good mechanical properties and thermal shock resistance. In operation, metal transfer to the coating does not take place during sliding contact wear.

As can be seen from FIG. 4 and FIG. 5, the same concept is used in which coating 70 is provided on the inner diameter surface of casing or shroud 48 and thin film tip coating 29 is provided on tip 28T of blade 28. Coating 70 is an abradable coating, Coating 29, also described in detail below, is also a thin film ceramic coating that has a melting or softening point higher than that of the abradable material and blade tip and blade tip 28T of blade 28. Coating 29 has high hardness, is very smooth, and has good mechanical properties and thermal shock resistance. In operation, metal transfer to the coating does not take place during sliding contact wear.

The invention is suitable for a range of non-abrasive blades and vanes. For aluminum blades and vanes, anodized layers of aluminum oxide are effective. For Ti blades and vanes, anodized layers of titanium dioxide or titanium nitride are effective. Generally, for all materials including Al, Ti, Fe and Ni based alloys, metal oxide, nitride carbide and boride layers are effective. Specifically, aluminum oxide, zirconium oxide, zirconium nitride, chromium oxide, chromium nitride, titanium oxide, titanium nitride, titanium carbo-nitride, titanium aluminum nitride, silicon nitride, silicon carbide, boron nitride boron carbide and tungsten carbide form effective non-abrasive blade tip coatings.

With respect to boronized surface layers, they are a diffusion case hardening treatment during which boride and di-boride phases are formed in the base metal's surface. These phases are high melting point very hard phases that will resist wear and metal transfer to the abradable coating. Borides also have low friction and low surface energy, so they will also resist the coating material transfer to the airfoil tips.

The composition of diffused layer will vary depending on the base material. For example, ferrous materials will form $FeB/FeB_2$. Nickel-based alloys will form $Ni_4B_3/Ni_2B/Ni_3B$. Cobalt-based alloys form $CoB/Co_2B/Co_3B$. Titanium-based alloys form $TiB/TiB_2$.

The micro-hardness of the diffused layer will vary depending on the base material. For example, $FeB/FeB_2$ layers will have a micro-hardness in the range of 1600-1900 HV. Other elements, such as Ni, Ti and Co, will produce a different hardness range, some even higher that $FeB/FeB_2$.

Presented below are examples of diffused layers of this invention with the micro-hardness, coefficient of friction values they produce.

TABLE I

| Name | Composition | Color | Micro-hardness (HV 0.05 g) | Coefficient of Friction |
|---|---|---|---|---|
| Medikote ™ C | TiN | Gold | 2300-2500 | 0.35 |
| Medikote ™ C3 | CrN | Silver | 2000-2200 | 0.35 |
| Medikote ™ C5 | TiN/TiCN | Bronze/Gray | 2800-3200 | 0.30 |
| Medikote ™ C6 | AlTiN | Violet/Black | 3000-3400 | 0.35 |
| Medikote ™ C6B | TiAlN | Copper/Bronze | 3000-3200 | 0.4 |
| Medikote ™ C6JB | AlTiN | Black | 3000-3400 | 0.4 |
| Medikote ™ C8 | ZrN | Pale Gold | 2300-2500 | 0.35 |

The microhardness of the thin film ceramic coating ranges from 2,000 to 3,400 HV 0.05 g. The coefficient of friction of the thin film ceramic coating ranges from 0.35 to 0.40.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine comprising:
  an engine casing extending circumferentially about an engine centerline axis; and
  a compressor section, a combustor section, and a turbine section within said engine casing;
  wherein at least one of said compressor section and said turbine section includes at least one airfoil and at least one seal member adjacent to the at least one airfoil, wherein a tip of the at least one airfoil is metal having a smooth thin film ceramic coating and the at least one seal member is coated with an abradable coating, the thin film ceramic coating having a melting or softening point higher than that of the abradable coating and the tip of the at least one airfoil, wherein the thin film ceramic coating is selected from the group consisting of a metal oxide layer, a nitride layer, a carbide layer, a boride layer, and combinations thereof.

2. The gas turbine engine of claim 1, wherein the thin film ceramic coating comprises a boride layer, and wherein the boride layer is formed by a diffusion case hardening treatment during which boride and di-boride phases are formed in a base metal surface of the airfoil.

3. The gas turbine engine of claim 1, wherein the thin film ceramic coating is selected from the group consisting of aluminum oxide, zirconium oxide, zirconium nitride, chromium oxide, chromium nitride, titanium oxide, titanium nitride, titanium carbo-nitride, titanium aluminum nitride, silicon nitride, silicon carbide, boron nitride, boron carbide and tungsten carbide.

4. The gas turbine engine of claim 1, wherein the microhardness of the thin film ceramic coating ranges from 2,000 to 3,400 HV 0.05 g.

5. The gas turbine engine of claim 1, wherein the coefficient of friction of the thin film ceramic coating ranges from 0.35 to 0.40.

6. A method of forming a seal between at least one airfoil and at least one seal member, the method comprising:
   forming a smooth thin film ceramic coating on the tip of the at least one airfoil; and
   coating the at least one seal member with an abradable coating, wherein a melting or softening point of the thin film ceramic coating is higher than that of the abradable coating and the tip of the at least one airfoil and wherein the thin film ceramic coating is selected from the group consisting of a metal oxide layer, a nitride layer, a carbide layer, a boride layer, and combinations thereof.

7. The method of claim 6, wherein the thin film ceramic coating comprises a boride layer and is formed by a diffusion case hardening treatment during which boride and di-boride phases are formed in a base metal surface of the airfoil.

8. The method of claim 6, wherein the thin film ceramic coating is selected from the group consisting of aluminum oxide, zirconium oxide, zirconium nitride, chromium oxide, chromium nitride, titanium oxide, titanium nitride, titanium carbo-nitride, titanium aluminum nitride, silicon nitride, silicon carbide, boron nitride, boron carbide and tungsten carbide.

9. The method of claim 6, wherein the microhardness of the thin film ceramic coating ranges from 2,000 to 3,400 HV 0.05 g.

10. The method of claim 6, wherein the coefficient of friction of the thin film ceramic coating ranges from 0.35 to 0.40.

11. A coating on the tip of at least one metal airfoil adjacent to at least one seal member having an abradable coating, the coating comprising:
   a smooth thin film ceramic coating having a microhardness that ranges from 2,000 to 3,400 HV 0.05 g and a coefficient of friction that ranges from 0.35 to 0.40, and wherein the thin film ceramic coating has a melting or softening point higher than that of the abradable coating and the airfoil, and wherein the thin film ceramic coating is selected from the group consisting of a metal oxide layer, a nitride layer, a carbide layer, a boride layer, and combinations thereof.

12. The coating of claim 11, wherein the coating is formed by a diffusion case hardening treatment during which boride di-boride is formed in a base metal surface of the airfoil.

13. The coating of claim 11, wherein the thin film ceramic coating is selected from the group consisting of aluminum oxide, zirconium oxide, zirconium nitride, chromium oxide, chromium nitride, titanium oxide, titanium nitride, titanium carbo-nitride, titanium aluminum nitride, silicon nitride, silicon carbide, boron nitride boron carbide and tungsten carbide.

14. The coating of claim 13, wherein the thin film ceramic coating comprises a boride layer formed by a diffusion case hardening treatment during which boride and di-boride phases are formed in a base metal surface of the airfoil.

* * * * *